(12) United States Patent
Sharifi

(10) Patent No.: US 8,719,039 B1
(45) Date of Patent: May 6, 2014

(54) PROMOTING VOICE ACTIONS TO HOTWORDS

(71) Applicant: Google Inc., Mountain View, CA (US)

(72) Inventor: Matthew Sharifi, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/097,331

(22) Filed: Dec. 5, 2013

(51) Int. Cl.
G10L 21/00 (2013.01)

(52) U.S. Cl.
USPC ............ 704/275; 704/231; 704/251; 704/255

(58) Field of Classification Search
CPC ......... G10L 15/00; G10L 15/20; G10L 15/22; G10L 2015/00
USPC .................. 704/275, 231, 251, 255
See application file for complete search history.

(56) References Cited

U.S. PATENT DOCUMENTS

| 8,380,521 | B1 | 2/2013 | Maganti et al. | |
| 2003/0212562 | A1* | 11/2003 | Patel et al. | 704/275 |
| 2005/0203740 | A1* | 9/2005 | Chambers et al. | 704/254 |
| 2008/0133245 | A1* | 6/2008 | Proulx et al. | 704/277 |
| 2008/0165937 | A1* | 7/2008 | Moore | 379/88.04 |
| 2009/0215503 | A1* | 8/2009 | Zhang et al. | 455/569.1 |
| 2010/0161335 | A1 | 6/2010 | Whynot | |

FOREIGN PATENT DOCUMENTS

WO 2013/053798 4/2013

* cited by examiner

Primary Examiner — Qi Han
(74) Attorney, Agent, or Firm — Fish & Richardson P.C.

(57) ABSTRACT

Methods, systems, and apparatus, including computer programs encoded on a computer storage medium, for designating certain voice commands as hotwords. The methods, systems, and apparatus include actions of receiving a hotword followed by a voice command. Additional actions include determining that the voice command satisfies one or more predetermined criteria associated with designating the voice command as a hotword, where a voice command that is designated as a hotword is treated as a voice input regardless of whether the voice command is preceded by another hotword. Further actions include, in response to determining that the voice command satisfies one or more predetermined criteria associated with designating the voice command as a hotword, designating the voice command as a hotword.

20 Claims, 4 Drawing Sheets

US 8,719,039 B1

PROMOTING VOICE ACTIONS TO HOTWORDS

TECHNICAL FIELD

This disclosure generally relates to controlling computers using voice commands.

BACKGROUND

A computer may analyze a user's utterance and may perform an action in response. For example, a user may say "DRIVE HOME" and a computer may respond with directions for the user to drive home from their current location.

SUMMARY

In general, an aspect of the subject matter described in this specification may involve a process for designating certain voice commands as hotwords. As used by this specification, a "hotword" may refer to a term that wakes a device up from a sleep state or hibernation state, or a term that triggers semantic interpretation on the term or on one or more terms that follow the term, e.g., on voice commands that follow the hotword.

For example, in the utterance "OK COMPUTER, DRIVE HOME," the term "OK COMPUTER," may be a hotword that triggers semantic interpretation on the following term "DRIVE HOME," and the term "DRIVE HOME" may correspond to a voice command for providing directions to the user's home. When the system receives sound corresponding to the utterance "OK COMPUTER, DRIVE HOME," the system may determine that the utterance begins with the hotword, "OK COMPUTER," may, in response, transcribe the sound, may perform semantic interpretation on the transcription of the voice command "DRIVE HOME," and may output directions for the user to drive home.

Hotwords may be useful for "always on" systems that may potentially pick up sounds that are not directed to the system. For example, the use of hotwords may help the system discern when a given utterance is directed at the system, as opposed to an utterance that is directed to another individual present in the environment. In doing so, the system may avoid computationally expensive processing, e.g., semantic interpretation, on sounds or utterances that do not include a hotword.

Requiring a user to use a hotword like "OK COMPUTER" before voice commands like "DRIVE HOME," however, may be inconvenient or may feel unnatural to a user. Accordingly, the system may designate certain voice commands as hotwords so that the system may recognize that the voice command is directed to the system even if another predesignated hotword, such as "OK COMPUTER," is not said before the voice command.

The system may designate voice commands as hotwords based on determining that the voice command satisfies one or more predetermined criteria associated with designating the voice command as a hotword. The predetermined criteria may include a quantity of issuances of the voice command, a quality of acoustic features associated with the voice command, a score reflecting phonetic suitability of the voice command as a hotword, or an amount of acoustic features stored for the voice command.

Once the system designates the voice command as a hotword, users may trigger the system to perform actions in response to the voice command without needing to use another hotword before the voice command. For example, after the voice command "DRIVE HOME" is designated as a hotword, the system may respond to a user saying "DRIVE HOME" with directions even when the user does not say "OK COMPUTER" before saying "DRIVE HOME."

In some aspects, the subject matter described in this specification may be embodied in methods that may include the actions of receiving a hotword followed by a voice command. Additional actions may include determining that the voice command satisfies one or more predetermined criteria associated with designating the voice command as a hotword, where a voice command that is designated as a hotword is treated as a voice input regardless of whether the voice command is preceded by another hotword. Further actions may include, in response to determining that the voice command satisfies one or more predetermined criteria associated with designating the voice command as a hotword, designating the voice command as a hotword.

Other versions include corresponding systems, apparatus, and computer programs, configured to perform the actions of the methods, encoded on computer storage devices.

These and other versions may each optionally include one or more of the following features. For instance, in some implementations additional actions may include determining that the voice command is not already designated as a hotword, where determining that the voice command satisfies one or more predetermined criteria associated with designating the voice command as a hotword is in response to determining that the voice command is not already designated as a hotword.

In certain aspects, further actions may include in response to designating the voice command as a hotword, undesignating another voice command that is designated as a hotword. Additional actions may include determining the other voice command is a least recently used hotword, where undesignating another voice command that is designated as a hotword is in response to determining the other voice command is a least recently used hotword. Actions may also include determining the other voice command is a least frequently used hotword, where undesignating another voice command that is designated as a hotword is in response to determining the other voice command is a least frequently used hotword.

In some aspects, the one or more predetermined criteria may include one or more of a quantity of issuances of the voice command satisfying a quantity threshold, recency of issuances of the voice command satisfies a recency threshold, a quality of acoustic features associated with the voice command satisfying a quality threshold, a score reflecting phonetic suitability of the voice command as a hotword satisfying a phonetic suitability threshold, or an amount of acoustic features stored for the voice command at a server or a client device satisfying an amount threshold.

In some implementations, additional actions may include receiving an explicit user confirmation of designation of the voice command as a hotword, where designating the voice command as a hotword is in response to receiving the explicit user confirmation of designation of the voice command as a hotword. In certain aspects, receiving a hotword followed by a voice command may include receiving acoustic features of an utterance associated with the voice command.

In some aspects, additional actions may include training a first level hotword detector for detecting a first portion of a voice command that has been designated as a hotword. In some implementations, further actions may include training a second level hotword detector for detecting a second portion of the voice command that has been designated as a hotword. In certain aspects, additional actions may include receiving a subsequent voice command, detecting the first portion of the voice command that has been designated as a hotword in the subsequent voice command, in response to detecting the first portion of the voice command that has been designated as a hotword in the subsequent voice command, detecting the second portion of the voice command that has been designated as a hotword in the subsequent voice command, and in response to detecting the second portion of the voice command that has been designated as a hotword in the subsequent voice command, triggering a response to the subsequent voice command.

In certain aspects a voice command that is designated as a hotword may be input to at least one of a speech recognizer or a semantic interpreter without being preceded by a hotword. A voice command that is not designated as a hotword may not be input into at least one of a speech recognizer or a semantic interpreter if not preceded by a hotword.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
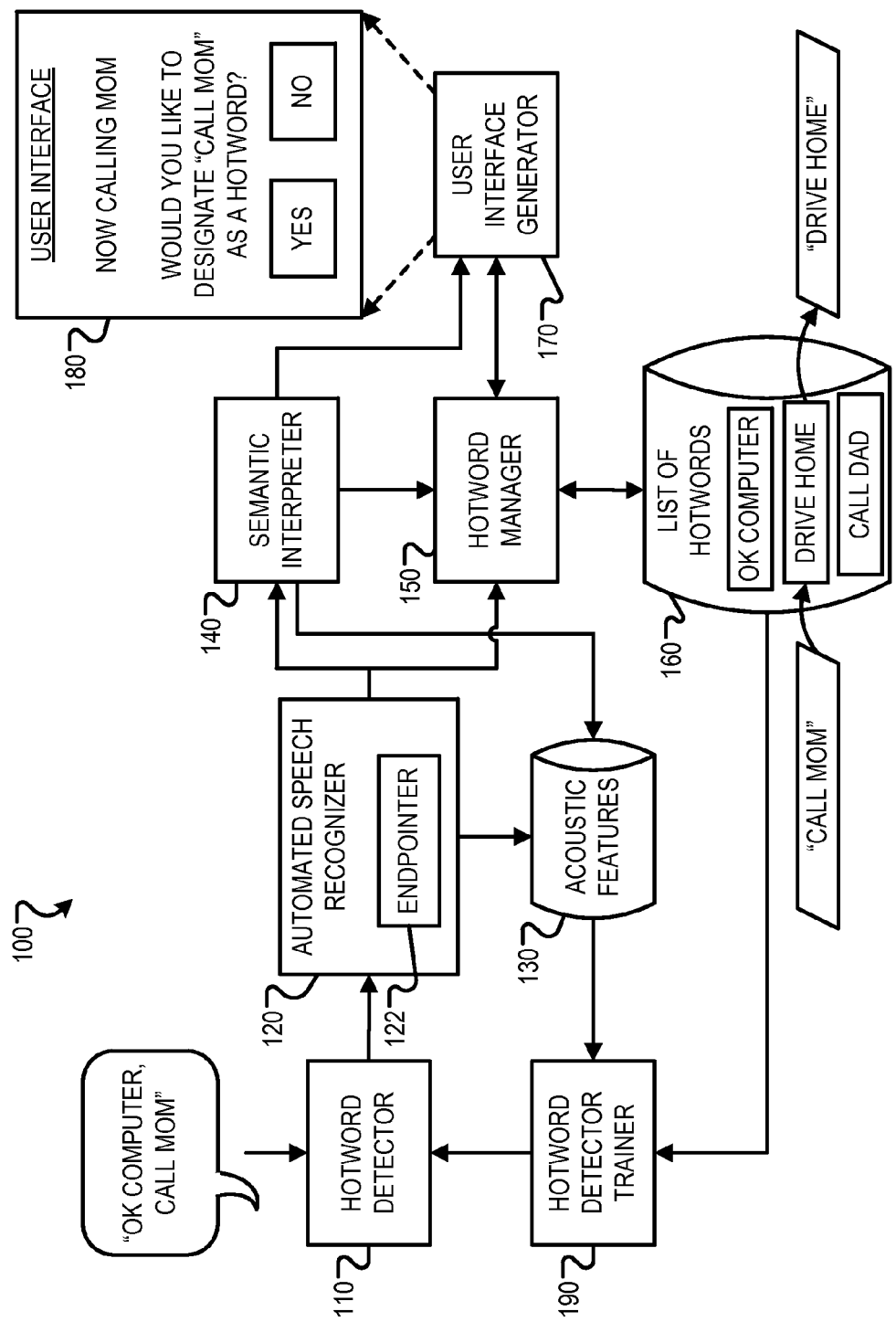
FIG. 1 is a block diagram of an example system for designating commonly used voice commands as hotwords.

FIG. 1 is a block diagram of an example system 100 for designating voice commands as hotwords. Generally, the system 100 may include a hotword detector 110 that detects hotwords, an automated speech recognizer 120 that recognizes speech, a semantic interpreter 140 that interprets the recognized speech, a hotword manager 150 that designates voice commands in the recognized speech as a hotword, a user interface generator 170 that generates a user interface 180, and a hotword detector trainer 190 that trains the hotword detector 110 based on the voice commands that are designated as hotwords.

The system 100 may receive sounds corresponding to an utterance (in the figure, "OK COMPUTER, CALL MOM"), where the sounds may be captured by an audio capture device, e.g., a microphone, that converts sounds into an electrical signal. The utterance may include a hotword. A hotword may be a spoken phrase that causes the system 100 to treat a subsequently spoken phase as a voice input for the system. In other words, a hotword may be a spoken phrase that explicitly indicates that a spoken input is to be treated as a voice command. Namely, a hotword may be a spoken phrase that triggers endpointing, automated speech recognition, or semantic interpretation on the hotword or one or more terms that follow the hotword.

For example, the term "OK COMPUTER" may trigger semantic interpretation on the following term "CALL MOM." The one or more terms that follow the hotword may be terms for a voice command that correspond to a particular action. For example, "CALL MOM" may be a voice command that instructs the system to initiate a telephone call to a contact in a user's address book that is associated with the alias of "MOM."

The hotword detector 110 may receive the sounds corresponding to the utterance and determine if the utterance includes a term that has been designated as a hotword. A voice command that is designated as a hotword may be a voice command that is treated as a voice input regardless of whether the voice command is preceded by another hotword. In other words, a voice command that is designated as a hotword may be a voice command that is treated as a voice input without requiring that a user explicitly indicate, e.g., press a listen button or say a hotword, that the system 100 should start listening for voice inputs. Conversely, a voice command that is not designated as a hotword may be a voice command that is only treated as a voice input if the voice command is preceded by a hotword. In other words, a voice command that is not designated as a hotword may be a voice command that is only treated as a voice input if the voice command is preceded by an explicit indication, e.g., pressing of a listen button or speaking of a hotword, that the voice command is to be treated as a voice input.

For example, the hotword detector 110 may determine that the utterance "OK COMPUTER, CALL MOM" includes the hotword "OK COMPUTER" if the hotword detector 110 detects acoustic features in the captured sounds that are characteristic of the hotword. The acoustic features may be mel-frequency cepstral coefficients (MFCCs) that are representations of short-term power spectrums of the utterance or may be mel-scale filterbank energies for the utterance. For example, the hotword detector 110 may detect that the utterance "OK COMPUTER, CALL MOM" includes the hotword "OK COMPUTER" based on generating MFCCs from the captured sound and classifying that the MFCCs include MFCCs that are similar to MFCCs that are characteristic of the hotword "OK COMPUTER."

Conversely, the hotword detector 110 may determine that the utterance "WHAT'S THE WEATHER LIKE FOR TODAY" that a user may say to another person does not includes the hotword "OK COMPUTER" if the hotword detector 110 does not detect acoustic features generated from the captured sound that are characteristic of a hotword. If the hotword detector 110 determines that the utterance does not include a hotword, the system 100 may then disregard the utterance. For example, the system 100 may disregard the utterance, "WHAT'S THE WEATHER LIKE FOR TODAY," after determining that the utterance does not include a hotword.

If the hotword detector 110 determines that the utterance may include a hotword, e.g., based on detecting that some or all of the acoustic features of the sound corresponding to the hotword are similar to acoustic features characteristic of a hotword, the automated speech recognizer 120 may then process the utterance by recognizing speech in the utterance. The automated speech recognizer 120 may transcribe the captured sound into text. For example, the automated speech recognizer 120 may transcribe the captured sound corresponding to the utterance "OK COMPUTER, CALL MOM" into the text "OK COMPUTER, CALL MOM." In some implementations, the automated speech recognizer 120 may not transcribe the portion of the captured sound that may correspond to the hotword. For example, for the utterance "OK COMPUTER, CALL MOM," the automated speech recognizer 120 may omit transcribing the portion of the captured sound corresponding to the hotword "OK COMPUTER" and only transcribe the following portion of the captured sound corresponding to "CALL MOM."

The automated speech recognizer 120 may include an endpointer 122 that assists with transcribing the captured sound. The endpointer 122 may isolate where individual words or phrases begin and end within the captured sound. The automated speech recognizer 120 may then transcribe the isolated individual words or phrases.

In some implementations, the automated speech recognizer 120 may further confirm that the utterance includes the hotword. The automated speech recognizer 120 may transcribe at least a corresponding portion of the captured sound that the hotword detector 110 determined includes the hotword and confirm that the transcription includes the hotword.

For example, the hotword detector 110 may detect MFCCs generated from a portion of the captured sound are similar to MFCCs of the hotword "OK COMPUTER" and in response, the automated speech recognizer 120 may transcribe the portion of the captured sound and confirm whether the transcription includes the hotword "OK COMPUTER." If the automated speech recognizer 120 determines the transcription does not include the hotword, the system 100 may then disregard the utterance without processing the remaining portions of the captured sound. On the other hand, if the automated speech recognizer 120 determines a transcription does include the hotword, the system 100 may continue processing the captured sound. For example, the automated speech recognizer may continue transcribing the remaining portion of the captured sound and provide the transcription to the semantic interpreter 140.

The semantic interpreter 140 may receive the transcription of the captured sound corresponding to the utterance that includes the hotword, and perform semantic interpretation of the transcription to determine if the utterance includes a voice command. In performing semantic interpretation, the semantic interpreter 140 may parse or tokenize the transcription according to various grammar rules to determine if the terms in the transcription correspond to a voice command. For example, the semantic interpreter 140 may compare pre-defined voice command patterns, that may be associated with grammar rules, with the transcription to determine if one or more terms in the transcription match one or more terms in the pre-defined voice command patterns. As an example, a pre-defined voice command pattern corresponding to a voice command for calling someone may be "CALL [ARGUMENT]," where "[ARGUMENT]" may represent an identification of a contact to be called.

If the semantic interpreter 140 determines that a pre-defined voice command pattern matches one or more terms in the transcription, the semantic interpreter 140 may determine that the utterance includes the voice command that corresponds to the pre-defined voice command pattern. In some implementations, the semantic interpreter 140 may additionally determine if the utterance includes a voice command based on a user confirmation that the utterance includes the voice command. For example, if the semantic interpreter 140 determines that a transcription for the captured sound corresponding to the utterance "CALL MOM" matches a pre-defined voice command pattern "CALL [ARGUMENT]," the system 100 may prompt the user to confirm that user wishes to call the contact "MOM." The semantic interpreter 140 may then determine that the utterance includes the voice command based on a confirmation from the user that the user wishes to call a contact with the alias "MOM."

If the semantic interpreter 140 does not determine an utterance includes a voice command, the system 100 may stop processing the utterance and disregard the utterance, or alternatively, prompt the user to repeat the utterance. For example, due to background noise or distortions, an utterance "OK COMPUTER, CALL MOM" may be incorrectly transcribed as "OK COMPUTER, CULL MON" and the semantic interpreter 140 may determine that no voice command corresponds to the incorrect transcription. However, if the system 100 determines that the hotword "OK COMPUTER" is in the utterance, the system may recognize that the terms following "OK COMPUTER" are likely terms for a voice command but may have been incorrectly transcribed. Thus, the system 100 may request the user repeat the utterance.

If the semantic interpreter 140 does determine an utterance includes a voice command, the semantic interpreter 140 may trigger the storage of the acoustic features for the captured sound that may be generated by the automated speech recognizer 120 and correspond to the utterance in an acoustic feature database 130. In some implementations, the semantic interpreter 140 may generate the acoustic features or receive acoustic features generated by the automated speech recognizer 120 or hotword detector 110.

The acoustic feature database 130 may store acoustic features of captured sounds corresponding to utterances in association with corresponding voice commands. For example, the semantic interpreter 140 may receive the transcription "OK COMPUTER, CALL MOM" and determine that the term "CALL" corresponds to a voice command for initiating a call, and the term "MOM" corresponds to the alias of a person to be called. Accordingly, the semantic interpreter 140 may then trigger storage in the acoustic feature database 130 of acoustic features for the captured sound in association with the voice command "CALL MOM". By storing the acoustic features in association with the voice commands, the acoustic feature database 130 may enable the stored acoustic features that correspond to a particular voice command to be easily identified based on the stored association.

Additionally, if the semantic interpreter 140 determines an utterance includes a voice command, the semantic interpreter 140 may trigger the hotword manager 150 to evaluate whether the voice command should be designated as a hotword. For example, the semantic interpreter 140 may receive the transcription "OK COMPUTER, CALL MOM" and determine that the term "CALL" corresponds to a voice command for initiating a call, and the term "MOM" corresponds to the alias of a person to be called. The semantic interpreter 140 may then trigger the hotword manager 150 to evaluate whether the voice command "CALL MOM" should be designated as a hotword.

The hotword manager 150 may evaluate whether the voice command should be designated as a hotword based on determining whether the voice command satisfies one or more predetermined criteria associated with designating voice commands as hotwords. The predetermined criteria may include determining that the voice command is not already designated as a hotword. For example, the hotword manager 150 may not designate a voice command as a hotword if the voice command is already designated as a hotword, and may designate a voice command as a hotword if the voice command is not already designated as a hotword. The hotword manager 150 may determine that the voice command is not already a hotword by receiving a list of hotwords 160 and determining that the voice command is not in the list of hotwords 160. The list of hotwords 160 may list all the hotwords that the system 100 considers as hotwords. For example, the list of hotwords 160 may list non-voice command "OK COMPUTER" and voice commands "DRIVE HOME" and "CALL DAD" as hotwords.

As an example, if the user says "OK COMPUTER, CALL MOM," the hotword manager 150 may determine that the voice command "CALL MOM" is not in a list of hotwords 160. Accordingly, the hotword manager 150 may determine that the voice command "CALL MOM" should be designated as a hotword. As another example, if the user says "OK COMPUTER, CALL DAD," the hotword manager 150 may determine that the voice command "CALL DAD" is in a list of hotwords 160. Accordingly, the hotword manager 160 may determine that the voice command "CALL DAD" should not be designated again as a hotword.

The predetermined criteria may, additionally or alternatively, include whether a quantity of issuances of the voice command satisfies a threshold. For example, the hotword manager 150 may designate a voice command as a hotword if the voice command has been issued by the user, e.g., spoken by the user, at least a particular threshold number of times, e.g., ten times.

As an example, if the user says "OK COMPUTER, CALL MOM," the hotword manager 150 may determine that the voice command "CALL MOM" has been spoken ten times by the user, satisfying a threshold of ten times. Accordingly, the hotword manager 150 may determine that the voice command "CALL MOM" should be designated as a hotword. As another example, if the user says "OK COMPUTER, OPEN WEB BROWSER," the hotword manager 150 may determine that the voice command "OPEN WEB BROWSER" has been spoken twice by the user, below and not satisfying a threshold of ten times. Accordingly, the hotword manager 150 may determine that the voice command "OPEN WEB BROWSER" should not be designated as a hotword.

Additionally or alternatively, the predetermined criteria may include whether a quality of acoustic features associated with the voice command satisfies a threshold. For example, the hotword manager 150 may designate that a voice command be designated a hotword if the hotword manager 150 determines that the acoustic features stored in the acoustic feature database 130 for the voice command are not acoustic features that are characteristic of background noise.

As an example, if the user says "OK COMPUTER, CALL MOM," the hotword manager 150 may determine that the acoustic features stored in the acoustic feature database 130 associated with the voice command "CALL MOM" are not acoustic features that are characteristic of background noise. Accordingly, the hotword manager 150 may determine that the voice command "CALL MOM" should be designated as a hotword. As another example, if the user says "OK COMPUTER, OPEN WEB BROWSER," the hotword manager 150 may determine that the acoustic features stored in the acoustic feature database 130 associated with the voice command "OPEN WEB BROWSER" include many acoustic features that are characteristic of background noise. Accordingly, the hotword manager 150 may determine that the voice command "OPEN WEB BROWSER" should not be designated as a hotword.

Additionally or alternatively, the predetermined criteria may include whether a score reflecting phonetic suitability of the voice command as a hotword satisfies a threshold. The phonetic suitability score of the voice command may indicate how easily distinguishable the terms in the voice command are from other terms. The hotword manager 150 may score the voice command such that voice commands that are more phonetically unique, which may be less likely to be incorrectly transcribed or less likely to be used in utterances that do not include voice commands directed at the system, may receive better scores.

As an example, if the user says "OK COMPUTER, NAVIGATE TO GOLDEN GATE BRIDGE," the hotword manager 150 may determine that the voice command "NAVIGATE TO GOLDEN GATE BRIDGE" has a high phonetic suitability score of 90%, which is above a threshold of 70%. Accordingly, the hotword manager 150 may determine that the voice command "NAVIGATE TO GOLDEN GATE BRIDGE" should be designated as a hotword. As another example, if the user says "OK COMPUTER, CALL ER," the hotword manager 150 may determine that the voice command "CALL ER" has a low phonetic suitability score of 30%, which is below the threshold of 70%, because "CALL ER" may sound similar to a commonly used term "CALLER" and "CALL HER." Accordingly, the hotword manager 150 may determine that the voice command "CALL ER" should not be designated as a hotword.

Additionally or alternatively, the predetermined criteria may include whether an amount of acoustic features stored for the voice command at a server or a client device satisfies a threshold. For example, the hotword manager 150 may designate that a voice command be designated as a hotword based on determining that the number of acoustic features stored for the voice command is above a particular threshold, e.g., four thousand acoustic features. In another example, the hotword manager 150 may not designate that a voice command be designated as a hotword based on determining that the number of acoustic features stored for the voice command is one thousand, below a particular threshold of four thousand acoustic features. Alternate or additional acoustic feature related thresholds may include the size of each acoustic feature, the duration of each acoustic feature, or the total duration of acoustic features. For example, the hotword manager 150 may designate that a voice command be designated as a hotword based on determining that the total number of seconds of audio, e.g., stored acoustic features, corresponding to the hotword is above a threshold number of seconds, e.g., thirty seconds.

The hotword manager 150 may determine that a voice command should be designated as a voice command based on any one predetermined criteria or a combination of predetermined criteria. For example, the hotword manager 150 may require that all the predetermined criteria be satisfied, a particular quantity of the predetermined criteria be satisfied, or a score for the voice command based on the predetermined criteria satisfy a particular threshold.

The hotword manager 150 may also limit the number of hotwords that may be used by the system 100. For example, the hotword manager 150 may limit the system to having three hotwords at a time. The system 100 may limit the number of hotwords because including more hotwords may make the system 100 less accurate, subject to overtriggering or undertriggering, and including more hotwords may be computationally expensive. Accordingly, when the hotword manager 150 designates a voice command as a hotword, if there are already a maximum number of designated hotwords, the hotword manager 150 may undesignate another voice command that is designated as a hotword.

The hotword manager 150 may undesignate the voice command that has been least recently used or least frequently used as a voice command. In some implementations, in determining whether to designate a voice command as a hotword, the hotword manager 150 may compare use of voice commands already designated as hotwords with the voice command that may be designated as a hotword. For example, the hotword manager 150 may determine if the voice command to be designated as a hotword is more frequently used than voice command already designated as a hotword that is least frequently used that would be undesignated as a hotword. The hotword manager 150 may then only determine that the voice command be designated as a hotword if the voice command is more frequently used as a voice command than the voice command that is already designated as a hotword that would be undesignated. In some implementations, the hotword manager 150 may similarly undesignate the voice command that has been least recently used as a hotword or least frequently used as a hotword.

If the hotword manager 150 determines that the voice command should be designated as a hotword, the hotword manager 150 may trigger the user interface generator 170 to generate an interface 180 prompting the user if the voice command should be designated as a hotword. For example, the user interface generator 170 may generate an interface for output on a display, where the interface includes the text "NOW CALLING MOM, WOULD YOU LIKE TO DESIGNATE 'CALL MOM' AS A HOTWORD?" and a control of "YES" which the user can select to have the voice command be designated as a hotword and a control of "NO" which the user can select to not have the voice command be designated as a hotword.

In the case where the user selects not to have the voice command designated as a hotword, the hotword manager 150 may store that selection so that the system 100 knows in the future that the voice command should not be designated as a hotword. In some implementations, the system 100 may also notify the user what voice command already designated as a hotword will be removed as a hotword, or instead request that the user select a particular voice command already designated as a hotword to be removed as a hotword. In some implementations the system 100 may not prompt the user to select to have the voice command be designated as a hotword, but instead notify the user that the voice command is now designated as a hotword, and if applicable, notify the user what voice command is no longer designated as a voice command. The system 100 may designate a voice command as a hotword without an explicit user selection in circumstances where the hotword manager 150 has a high confidence (through high scores when comparing with criteria) that the terms for the voice command should be used as a hotword.

If the user selects the voice command be designated as a hotword, or if the system 100 does not prompt the user to select the voice command be designated as a hotword, the hotword manager 150 may add the voice command to the list of hotwords 160, and if applicable, remove a voice command from the list of hotwords 160. For example, the hotword manager 150 may add the voice command "CALL MOM" to the list of hotwords 160 and remove the voice command "DRIVE HOME" from the list of hotwords 160.

When a voice command is added as a hotword, the hotword detector trainer 190 may access the acoustic feature database 130 to train the hotword detector 110. The trainer 190 may train the hotword detector 110 based on machine-learning. Using machine-learning, the trainer 190 may train a model or classifier to recognize voice commands in the list of hotwords 160 based on the acoustic features stored in the acoustic feature database 130 that correspond to the voice commands.

For example, when the trainer 190 receives a list of hotwords 160 in which "CALL MOM" is newly added, the trainer 190 may access acoustic features stored in the acoustic feature database 130 that correspond to the voice command "CALL MOM" and train a classifier to detect that the acoustic features correspond to the voice command. The classifier may be a neural network, a support vector machine (SVM), or a Gaussian Mixture Model (GMM). Alternatively, instead of training using machine learning, the trainer 190 may cause the hotword detector 110 to detect for the voice command by performing dynamic time warping (DTW) matching of captured sound corresponding to utterances against the stored acoustic features for each voice command.

Different configurations of the system 100 may be used where functionality of the hotword detector 110, automated speech recognizer 120, endpointer 122, semantic interpreter 140, hotword manager 150, user interface generator 170, and hotword detector trainer 190 may be combined, further separated, distributed, or interchanged. The system 100 may be implemented in a single device or distributed across multiple devices.

Figure 2:
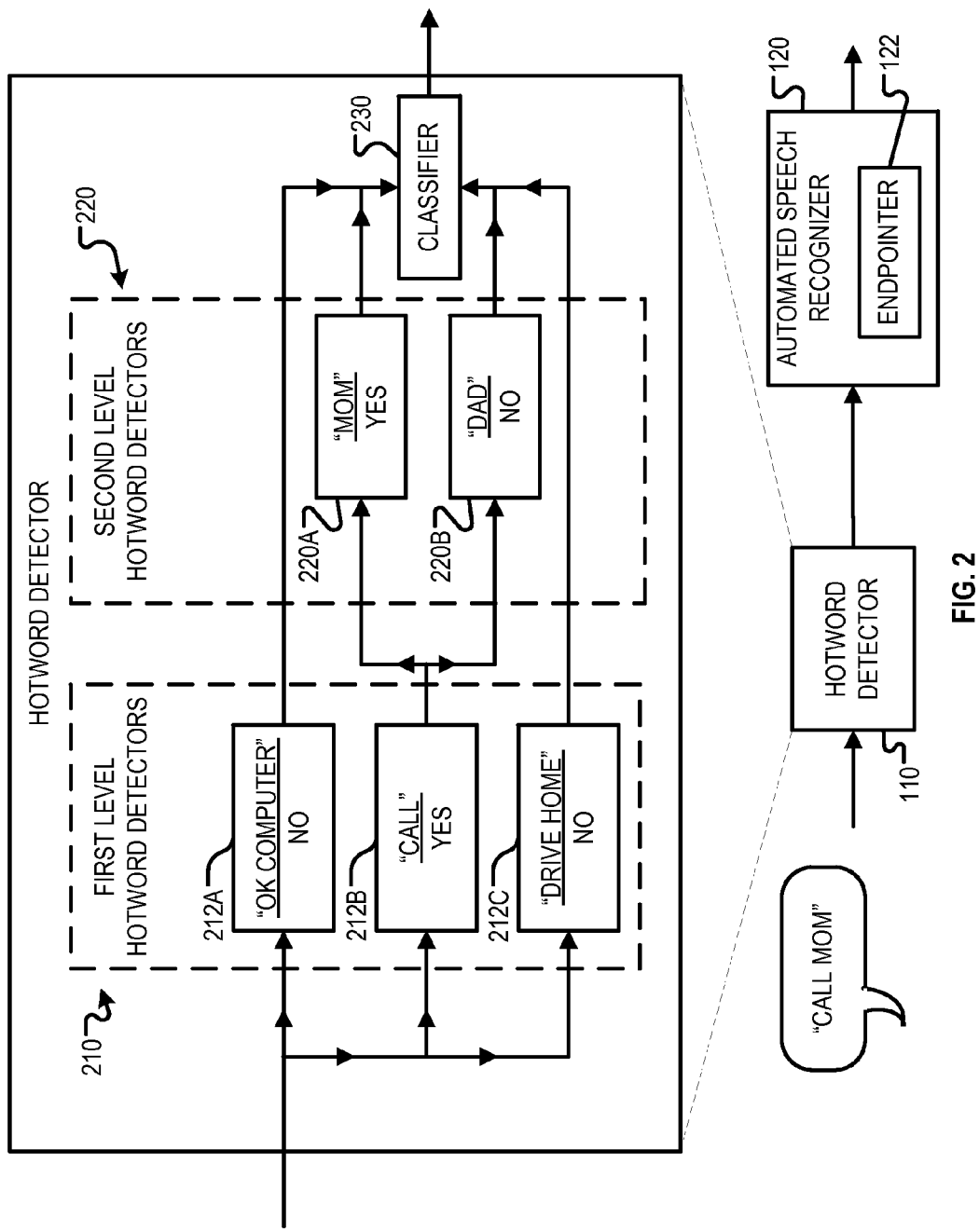
FIG. 2 is a block diagram of the example hotword detector shown in FIG. 1.

FIG. 2 is a block diagram of the example hotword detector 110 shown in FIG. 1. In some implementations, the hotword detector 110 may determine if the captured sound includes any hotword. For example, the hotword detector 110 may include individual hotword detectors for each hotword that detect for corresponding hotwords. The individual hotword detectors may detect the corresponding hotwords at the same time, e.g., in parallel. Detecting for hotwords in parallel may reduce computational time and make the system 100 seem more responsive to a user. However, detecting multiple hotwords in parallel may be computationally expensive, may reduce battery life, and may reduce accuracy of hotword detection.

Accordingly, in some implementations, the hotword detector 110 may detect hotwords using a hierarchy of hotword detectors. Generally, voice commands may begin with a trigger word that corresponds to a particular action, e.g., "OPEN," "DRIVE," "CALL," or "SHOW," followed by an object of the action, e.g., Mom, Dad, Web Browser, Calendar, Home. The hierarchy may cluster hotwords based on similarities in the terms of the hotwords. For example, the hotwords "CALL MOM" and "CALL DAD" may be clustered together because both hotwords start with the same term "CALL" for the action of calling. Accordingly, if an utterance does not include the term "CALL," the hotword detector 110 may know not to determine if the utterance includes the term "MOM" or the term "DAD" if no other hotwords include the terms "MOM" or "DAD." In some implementations, the hierarchy may cluster hotwords based on the type of action the hotwords cause to be performed. For example, hotwords "NAVIGATE TO WORK," "GO TO WORK," and "DRIVE TO WORK," may all correspond to a type of action of providing route guidance. Accordingly, if an utterance does not include any terms, e.g., "NAVIGATE TO," "GO TO," and "DRIVE TO," that are clustered to correspond to a type of action of providing route guidance, the hotword detector 110 may know not to determine if the utterance includes the term "WORK" if no other hotwords include the term "WORK."

The hotword detector 110 may include first level hotword detectors 210, second level hotword detectors 220, and a classifier 230. The first level hotword detectors 210 may determine if an utterance includes a hotword or a portion of a hotword. Generally, with the exception of "OK COMPUTER," the first level hotword detectors may detect portions of hotwords that correspond with actions. For example, first level hotword detectors may include a detector that detects if the utterance includes "OK COMPUTER" 212A, "CALL" 212B, or "DRIVE HOME" 212C. As shown in FIG. 2, when the utterance "CALL MOM" is received, the detector "OK COMPUTER" 212A may determine a "NO," representing that "OK COMPUTER" is not detected in the utterance, the detector "CALL" 212B may determine a "YES," representing that "CALL" is detected in the utterance, and the detector "DRIVE HOME" 212C may determine a "NO," representing that "DRIVE HOME" is not detected in the utterance.

The second level hotword detectors 220 may determine if the utterance that the first level hotword detector 210 determines includes a portion of a hotword includes a remaining portion of the hotword. Generally, the second level hotword detectors 220 may detect portions of hotwords that correspond with objects. For example, the second level hotword detectors 210 may include a detector 220A subsequent to the first level hotword detector for "CALL" 212B that detects if "MOM" follows "CALL," and another detector 220B subsequent to the first level hotword detector for "CALL" 212B that detects if "DAD" follows "CALL." As shown in FIG. 2, for the utterance "CALL MOM" the second level hotword detector 220A for "MOM" may determine that the utterance does include "MOM" and the second level hotword detector 220B for "DAD" may determine that the utterance does not include "DAD."

The hotword detector 110 may also include additional levels of hotword detectors. For example, if the voice commands designated as hotwords include "CALL MOM AT HOME," "CALL MOM AT WORK," and "CALL MOM ON CELL," the hotword detector 110 may include a first level hotword detector for detecting "CALL," a second level hotword detector for detecting "MOM," and third level hotword detectors for detecting, respectively, "AT HOME," "AT WORK," and "ON CELL."

If the particular first level hotword detectors 210 which the second level hotword detectors correspond do not detect the first portion of the hotword, processing by the second level hotword detectors may be skipped, saving computational expense and battery life. For example, if captured sound corresponding to the utterance "DRIVE HOME" or "WHAT IS THE WEATHER LIKE TOMORROW" is received, the first level hotword detector for "CALL" 212B may not detect "CALL" in the sound so processing by the second level detectors for "MOM" 220A and "DAD" 220B may be skipped. Similarly, lower level hotword detectors, e.g., third level hotword detectors, that correspond to the first level hotword detector 210 or second level hotword detector 220 may also be skipped if the corresponding first level hotword detector 210 does not detect the first portion of a hotword or the corresponding second level hotword detector 220 does not detect the second portion of a hotword. In some implementations where hotwords are clustered based on types of actions the hotwords cause to be performed, a second level hotword detector may be shared by multiple first level hotword detectors 210. For example, the hotwords "GO TO WORK," "DRIVE TO WORK," and "NAVIGATE TO WORK," may correspond to a second level hotword detector for "WORK" that corresponds to first level hotword detectors for "GO TO," "DRIVE TO," and "NAVIGATE TO."

The classifier 230 may classify the utterance as including a hotword or not based on the determinations made by the first level hotword detectors 210 and second level hotword detectors 220. For example, if a first level hotword detector that has no corresponding second level hotword detector detects a hotword, the classifier 230 may classify the utterance as including a hotword. In another example, if the first level hotword detector and a corresponding second level hotword detector detect a hotword, the classifier 230 may classify the utterance as including a hotword. Conversely, if no first level hotword detector that has no corresponding second level hotword detector detects a hotword and no first level hotword detector and corresponding second level hotword detector detects a hotword, then the classifier 230 may classify that the utterance does not include a hotword.

The hotword detector 110 may include different number of detectors in each level of hotword detectors based on the voice commands that are designated as hotwords. For example, more voice commands designated as hotwords that start with "CALL" may result in more second level hotword detectors and more voice commands designated as hotwords that start with terms for different actions may result in more first level hotword detectors.

Figure 3:
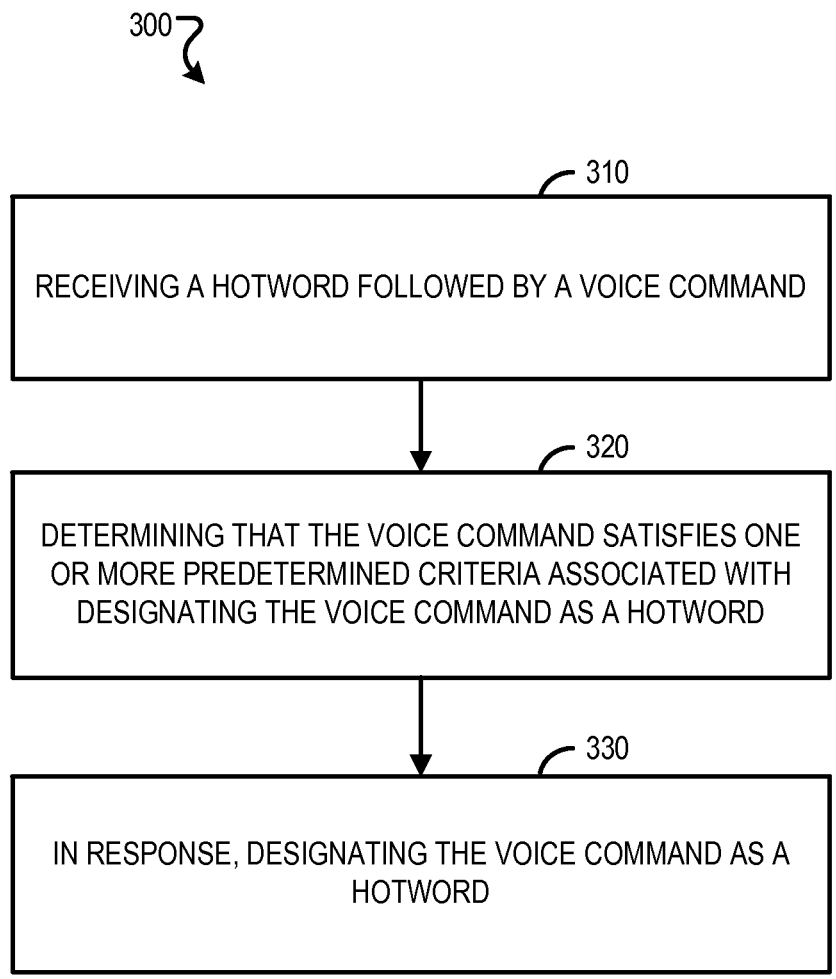
FIG. 3 is a flowchart of an example process for classifying utterances.

FIG. 3 is a flowchart of an example process for classifying utterances. The following describes the processing 300 as being performed by components of the system 100 that are described with reference to FIG. 1. However, the process 300 may be performed by other systems or system configurations.

The process 300 may include receiving a voice command (310). For example, the hotword detector 110 may receive captured sound corresponding to an utterance "OK COMPUTER, OPEN CALENDAR" and detect that the captured sound includes the hotword "OK COMPUTER." Based on the determination, the automated speech recognizer 120 may transcribe the captured sound into the text "OK COMPUTER, OPEN CALENDAR." The semantic interpreter 140 may then determine that the transcription matches a predefined voice command pattern of "OPEN [ARGUMENT]," where "[ARGUMENT]" is an identifier for an application. Based on determining the match, the semantic interpreter 140 may store acoustic features of the captured sound in association with the voice command "OPEN CALENDAR" and may trigger the hotword manager 150 to determine if the voice command "OPEN CALENDAR" should be designated as a hotword.

The process may include determining that the voice command satisfies one or more predetermined criteria associated with designating the voice command as a hotword (320). For example, the hotword manager 150 may determine if the voice command "OPEN CALENDAR" should be designated as a hotword based at least on one or more of acoustic features stored for the voice command, usage statistics of the voice command, usage statistics of voice commands already designated as hotwords, and a user confirmation to designate the voice command as a hotword.

The process may include, in response to determining that the voice command satisfies one or more predetermined criteria associated with designating the voice command as a hotword, designating the voice command as a hotword (330). For example, the hotword manager 150 may add the voice command to a list of hotwords 160 and remove a voice command already designated as a hotword from the list of hotwords 160. The hotword detector trainer 190 may then configure the hotword detector 110 to detect the voice command "OPEN CALENDAR" using stored acoustic features for the voice command.

In configuring the hotword detector, the hotword detector trainer 190 may determine if the voice command should correspond to a first level hotword detector or a second level hotword detector, or both. For example, the hotword detector trainer 190 may determine that another hotword "OPEN MAIL" begins with the term "OPEN" that corresponds to the action of opening. Accordingly, the hotword detector trainer 190 may determine that the hotword "OPEN CALENDAR" should be represented by a first level hotword detector for "OPEN" and a second level hotword detector for "CALENDAR," and the hotword "OPEN MAIL" should be represented by a second level hotword detector for "MAIL" that corresponds to the first level hotword detector for "OPEN."

In some implementations, the hotword detector 110 may also consider the current context of a device of a user. The context of the device may refer to what is currently being shown on the screen of the device. Certain hotwords may be enabled, disabled, upweighted, or downweighted based on what is being shown on the screen of the device. Upweighting a hotword may mean increasing the likelihood that the hotword is detected and downweighting a hotword may mean decreasing the likelihood that the hotword is detected. If a hotword detector 110 would normally find a 50% match between a hotword and the utterance, in circumstances when the hotword detector 110 upweights the hotword, the hotword detector 110 may determine that the hotword is detected in the utterance. Conversely, in circumstances when the hotword detector 110 downweights the hotword, if the hotword detector 110 finds a 50% match between a hotword and an utterance, the hotword detector 110 may determine that the hotword is not detected in the utterance.

Hotwords corresponding to voice actions of "CALL" may only be enabled or upweighted when a dialing application is shown on the phone and hotwords corresponding to voice actions of "OPEN" may only be enabled or upweighted when a homescreen is shown. In some implementations, a user interface may be shown to indicate to the user the hotwords corresponding to voice actions that are available in the current context of the device. The indication may be shown at all times, or only when a first level hotword detector detects a portion of a hotword in an utterance. For example, all the hotwords for voice commands for calling may be shown when the first level hotword detector detects that the user says "CALL." The user may then see the voice commands that are available. For example, the user may see that "CALL MOM" and "CALL DAD" are both voice commands that are hotwords and say "DAD" to initiate a call using an alias associated with "DAD."

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 4:
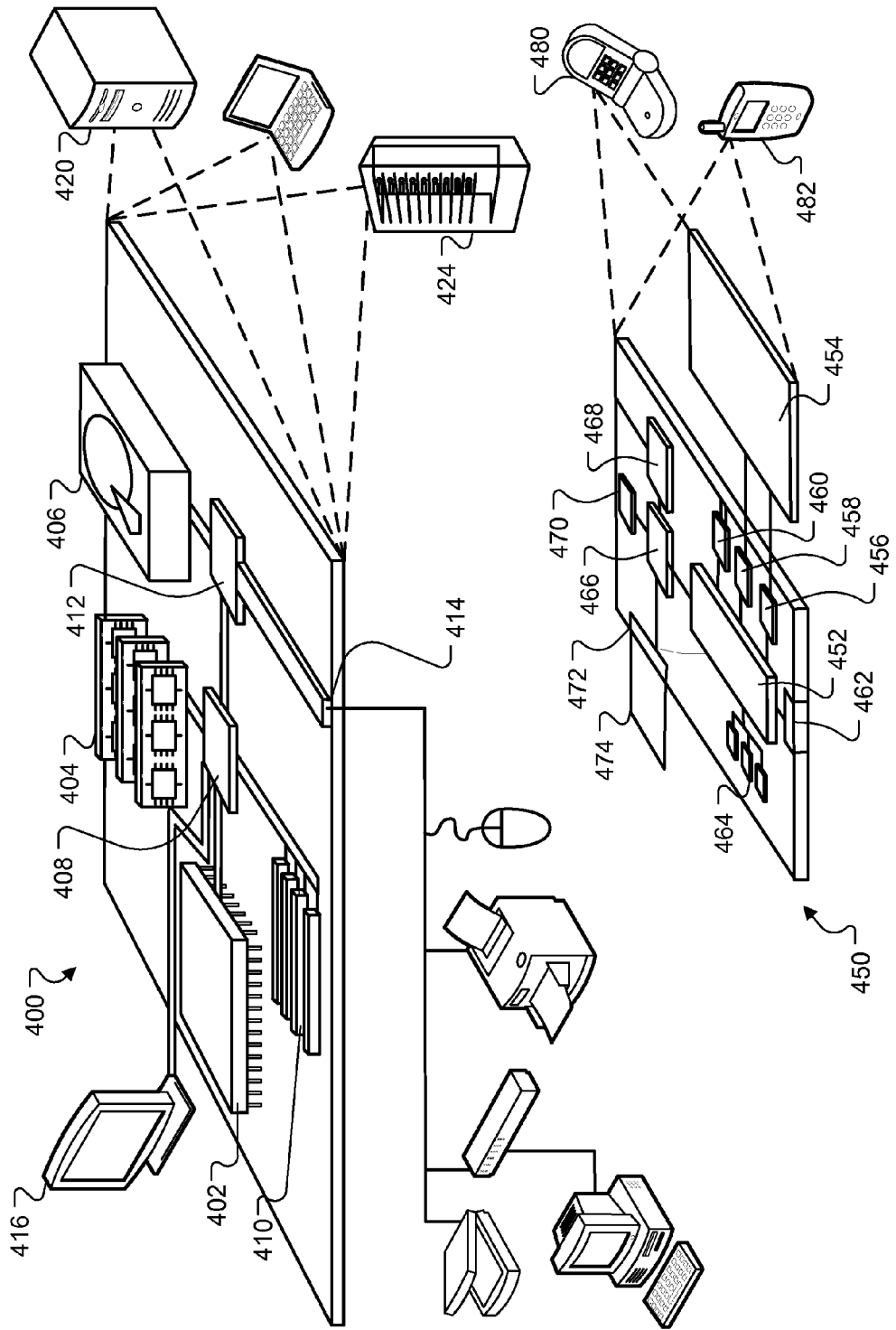
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A computer-implemented method comprising:
receiving a hotword followed by a voice command;
determining that the voice command satisfies one or more predetermined criteria associated with designating the voice command as a hotword, wherein a voice command that is designated as a hotword is treated as a voice input regardless of whether the voice command is preceded by another hotword; and
in response to determining that the voice command satisfies one or more predetermined criteria associated with designating the voice command as a hotword, designating by using one or more computer devices, the voice command as a hotword.

2. The method of claim 1, further comprising determining that the voice command is not already designated as a hotword, wherein determining that the voice command satisfies one or more predetermined criteria associated with designating the voice command as a hotword is in response to determining that the voice command is not already designated as a hotword.

3. The method of claim 1, further comprising in response to designating the voice command as a hotword, undesignating another voice command that is designated as a hotword.

4. The method of claim 3, further comprising determining the another voice command is a least recently used hotword, wherein undesignating another voice command that is designated as a hotword is in response to determining the another voice command is a least recently used hotword.

5. The method of claim 3, further comprising determining the another voice command is a least frequently used hotword, wherein undesignating another voice command that is designated as a hotword is in response to determining the another voice command is a least frequently used hotword.

6. The method of claim 1, wherein the one or more predetermined criteria comprises one or more of:
a quantity of issuances of the voice command satisfying a quantity threshold;
recency of issuances of the voice command satisfies a recency threshold;
a quality of acoustic features associated with the voice command satisfying a quality threshold;
a score reflecting phonetic suitability of the voice command as a hotword satisfying a phonetic suitability threshold; or
an amount of acoustic features stored for the voice command at a server or a client device satisfying an amount threshold.

7. The method of claim 1, further comprising receiving an explicit user confirmation of designation of the voice command as a hotword, wherein designating the voice command as a hotword is in response to receiving the explicit user confirmation of designation of the voice command as a hotword.

8. The method of claim 1, wherein receiving a hotword followed by a voice command comprises receiving acoustic features of an utterance associated with the voice command.

9. The method of claim 1, further comprising training a first level hotword detector for detecting a first portion of a voice command that has been designated as a hotword.

10. The method of claim 9, further comprising training a second level hotword detector for detecting a second portion of the voice command that has been designated as a hotword.

11. The method of claim 10, further comprising:
receiving a subsequent voice command;
detecting the first portion of the voice command that has been designated as a hotword in the subsequent voice command;
in response to detecting the first portion of the voice command that has been designated as a hotword in the subsequent voice command, detecting the second portion of the voice command that has been designated as a hotword in the subsequent voice command; and
in response to detecting the second portion of the voice command that has been designated as a hotword in the subsequent voice command, triggering a response to the subsequent voice command.

12. The method of claim 1, wherein a voice command that is designated as a hotword is input to at least one of a speech recognizer or a semantic interpreter without being preceded by a hotword.

13. The method of claim 1, wherein a voice command that is not designated as a hotword is not input into at least one of a speech recognizer or a semantic interpreter if not preceded by a hotword.

14. A system comprising:
one or more computers; and
one or more storage devices storing instructions that are operable, when executed by the one or more computers, to cause the one or more computers to perform operations comprising:
receiving a hotword followed by a voice command;
determining that the voice command satisfies one or more predetermined criteria associated with designating the voice command as a hotword, wherein a voice command that is designated as a hotword is treated as a voice input regardless of whether the voice command is preceded by another hotword; and
in response to determining that the voice command satisfies one or more predetermined criteria associated with designating the voice command as a hotword, designating the voice command as a hotword.

15. The system of claim 14, wherein the operations further comprise determining that the voice command is not already designated as a hotword, wherein determining that the voice command satisfies one or more predetermined criteria associated with designating the voice command as a hotword is in response to determining that the voice command is not already designated as a hotword.

16. The system of claim 14, wherein the operations further comprise in response to designating the voice command as a hotword, undesignating another voice command that is designated as a hotword.

17. The system of claim 14, wherein the operations further comprise determining the another voice command is a least recently used hotword, wherein undesignating another voice command that is designated as a hotword is in response to determining the another voice command is a least recently used hotword.

18. A non-transitory computer-readable medium storing instructions executable by one or more computers which, upon such execution, cause the one or more computers to perform operations comprising:
receiving a hotword followed by a voice command;
determining that the voice command satisfies one or more predetermined criteria associated with designating the voice command as a hotword, wherein a voice command that is designated as a hotword is treated as a voice input regardless of whether the voice command is preceded by another hotword; and
in response to determining that the voice command satisfies one or more predetermined criteria associated with designating the voice command as a hotword, designating the voice command as a hotword.

19. The non-transitory computer-readable medium of claim 18, wherein the operations further comprise determining that the voice command is not already designated as a hotword, wherein determining that the voice command satisfies one or more predetermined criteria associated with designating the voice command as a hotword is in response to determining that the voice command is not already designated as a hotword.

20. The non-transitory computer-readable medium of claim 18, wherein the operations further comprise in response to designating the voice command as a hotword, undesignating another voice command that is designated as a hotword.

* * * * *

UNITED STATES PATENT AND TRADEMARK OFFICE
CERTIFICATE OF CORRECTION

| | | |
|---|---|---|
| PATENT NO. | : 8,719,039 B1 | Page 1 of 1 |
| APPLICATION NO. | : 14/097331 | |
| DATED | : May 6, 2014 | |
| INVENTOR(S) | : Matthew Sharifi | |

It is certified that error appears in the above-identified patent and that said Letters Patent is hereby corrected as shown below:

In the Claims

Column 19, line 15, Claim 1, please delete "by" and insert therefor -- , by --.

Signed and Sealed this
Twenty-sixth Day of August, 2014

Michelle K. Lee
*Deputy Director of the United States Patent and Trademark Office*